| United States Patent [19] | [11] Patent Number: 5,008,336 |
| Richey, Jr. et al. | [45] Date of Patent: Apr. 16, 1991 |

[54] HIGH SOLIDS COATING COMPOSITIONS

[75] Inventors: Forrest A. Richey, Jr., Charleston; Kenneth L. Hoy, St. Albans, both of W. Va.

[73] Assignee: Union Carbide Chemicals And Plastics Technology Corporation, Danbury, Conn.

[21] Appl. No.: 472,662

[22] Filed: Jan. 30, 1990

[51] Int. Cl.$^5$ .............. C08F 8/32; C08F 20/02
[52] U.S. Cl. .................. 525/124; 525/134; 525/162; 525/442; 525/443
[58] Field of Search ............... 525/124, 134, 162, 442, 525/443

[56] References Cited

U.S. PATENT DOCUMENTS

| 4,064,294 | 12/1977 | Babil et al. | 521/146 |
| 4,069,183 | 1/1978 | Daimer | 523/416 |
| 4,400,216 | 8/1983 | Arora | 524/612 |
| 4,417,022 | 11/1983 | Chang et al. | |
| 4,520,167 | 5/1985 | Blank et al. | |
| 4,814,382 | 3/1989 | Hoy et al. | |

*Primary Examiner*—John C. Bleutge
*Assistant Examiner*—Vasu S. Jagannathan
*Attorney, Agent, or Firm*—Morris N. Reinisch

[57] ABSTRACT

Tri-substituted amine oxides having at least two reactive hydroxyls useful as reactive diluents in polyol polymer-containing coating compositions.

10 Claims, No Drawings

HIGH SOLIDS COATING COMPOSITIONS

This invention relates to high solids coating compositions containing amine oxide reactive diluents, which coating compositions can exhibit desirable adherence properties.

BACKGROUND TO THE INVENTION

In the past, coating compositions were commonly prepared by dissolving or dispersing film-forming organic polymers in volatile organic compounds (VOC). Environmental and health concerns associated with applications involving large-scale vapor emissions have led to research to provide coating compositions wherein the emission of volatile organic compounds is minimized.

Among the various methods of reducing the vapor emissions of coating compositions, the use of reactive diluents to replace all or part of the volatile organic solvent component of a coating composition is of particular interest. As used herein, the term "reactive diluent" refers to organic solvents or dispersants having as an integral part of their molecular structure, functional groups which are reactive with a film-forming polymer and/or cross-linking agent. The reactive diluent can thus be reacted to sufficiently high molecular weight to reduce its volatility and thus reduce volatile organic emissions from the coating composition.

In addition to providing a low level of volatile emissions, a coating composition should have a sufficiently low viscosity to permit easy handling and application. A reactive diluent should not, however, unduly adversely affect the sought performance properties of the coating composition or ultimate coating. These properties include sufficient stability to ensure a commercially acceptable shelf life and the ability to provide a cured coating having suitable properties such as toughness, adhesion, scratch resistance, weatherability, and resistance to attack by solvents, acids, bases and other chemicals.

Coating compositions wherein all or a portion of the volatile organic solvent component thereof is replaced by a reactive diluent are illustrated by the following patents:

U.S. Pat. No. 4,417,022, to Chang, et al., discloses coating compositions, the vehicle portion of which consists essentially of from about 60 percent to about 97 percent of a curable film-forming component and from about 3 percent to about 40 percent of an organic reactive diluent capable of chemically combining with the curable film-forming component. Disclosed as reactive diluents are ethers having less than five ether groups, amides, esters, urethanes, ureas, sulfur-containing compounds, and mixtures thereof which have one primary or secondary hydroxyl group. The reactive diluents disclosed by Chang, et al., are further characterized as having a retained solids value of greater than about 80 percent, a hydroxyl equivalent of from about 180 to about 800, and a liquid viscosity of less than about 10 poise at 60° C. Preferred reactive diluents disclosed by Chang, et al., are ester-containing reactive diluents, with ester-containing reactive diluents having allyl side chains being most preferred. Coating compositions having ester-containing reactive diluents, however, tend to produce cured coatings which lack desirable adhesion, hardness and/or weatherability.

As a further example, U.S. Pat. No. 4,520,167 to Blank, et al., discloses a coating composition comprising (a) a hydroxyalkyl carbamate of the formula:

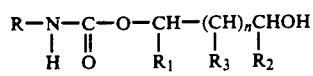

wherein n is 0 or 1, R is a $C_1$ to $C_{20}$ organic moiety which may contain one or more constituents selected from the class consisting of hetero-atoms and hydroxyl groups, and each of $R_1$, $R_2$ and $R_3$ is independently H or $CH_3$; (b) an aminoplast (amide-aldehyde) cross-linker; and (c) a polymer containing active sites which at elevated temperatures are reactive with the amide-aldehyde cross-linker (b).

Among the compounds which have been offered for use as reactive diluents in coating compositions are dicyclopentenyl-oxyethyl ethyl methacrylates, modified caprolactones, and unsaturated melamines. In general, these compounds are poor solvents, have relatively high viscosities and/or produce cured coatings having undesirable chemical and/or physical properties.

U.S. Pat. No. 4,814,382 to Hoy, et al., discloses high solids coating compositions containing reactive diluent comprising a surfactant-like carbamate, urea and/or amide derivative. The compositions are said to provide desirable toughness and adhesion and generally exhibit uniform surface appearances. The patentees postulate that the improvement in surface appearance is due to enhanced wetting ability and/or flowability.

A cured coating's toughness, adhesion, impact resistance, abrasion resistance, scratch resistance, weatherability and resistance to chemical attack depend to a large extent upon the film-forming polymer and reactive diluent and cross-linker components of the composition used to produce same. Coating compositions containing carbamate and urea derivatives as reactive diluents, such as disclosed in U.S. Pat. No. 4,814,382, often provide cured coatings having desirable toughness and adhesion.

As indicated above, industrial use of coatings is being increasingly limited in the amount of volatile organic compounds it can release into the atmosphere by government regulations intended to protect the environment and those who apply the coatings. This increasing pressure for change has created an opportunity for new technologies with potential for lower VOC. As mentioned above, one of these is the use of reactive diluents or cosolvents in place of all or part of the traditionally used solvents. Many early attempts to provide reactive cosolvents or diluents have failed because the resulting coating compositions suffered from degraded application or end-use properties.

SUMMARY OF THE INVENTION

In accordance with this invention, reactive diluent-containing coating compositions are provided which, when in the ultimate form of the coating, exhibit desirable adhesion properties while still possessing shelf stabilities and viscosities sought for coating compositions. Moreover, the reactive diluents useful in the coating compositions of this invention are compatible with conventional acid-catalyzed, cross-linking curing systems.

By this invention, the coating compositions comprise polyol-containing polymer, at least one cross-linking agent reactive with hydroxyls, optionally, catalyst, and at least one reactive diluent of the formula:

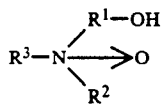

wherein $R^1$ is alkylene of 1 to about 6, preferably 2 or 3 carbon atoms; $R^2$ is alkyl or alkylhydroxy or alkylene alkyl ether of 2 to about 10, preferably 2 to 4, carbon atoms; and $R^3$ is alkyl of 1 to about 10 carbon atoms, aryl of 6 to 10 carbon atoms, alkaryl of 7 to 10 carbon atoms or aralkyl of 7 to 10 carbon atoms, which substituents may be substituted with hydroxy, with the proviso that the reactive diluent contains at least two reactive hydroxy groups. By providing the amine nitrogen as an oxide, the basicity of the nitrogen is reduced and thus is relatively inert with respect to acidic cross-linking catalysts, if any are present, i.e., the basicity of the amine is insufficient to unduly neutralize any acidic cross-linking catalyst that may be present. Yet, the amine function is available to facilitate adhesion properties of the coating composition.

DETAILED DESCRIPTION

The coating compositions of this invention comprise polyol-containing polymer and cross-linking agent. The polymer has what is sometimes referred to as "A" groups. "A" groups include —OH and —NHCO-moieties which are reactive with "B" groups of cross-linking agents. The cross-linking agents have greater than two "B" groups which may be amino cross-linker groups. The reactive diluents of the compositions of the invention contain at least two reactive "A" groups.

The polyol-containing polymers include those consisting essentially of hydrocarbon other than the hydroxyl functionalities and those containing ester and/or ether and/or urea and/or urethane and/or amide moieties in the backbone or as substituents. Representative polyol-containing polymers include polyester polyols, polyether polyols, polyamide polyols, polyimide polyols, polyurethane polyols, polyurea polyols, polyacrylic polyols and mixtures thereof. The molecular weight of the polyol-containing polymers may vary widely. In general with all other factors remaining constant, the higher the molecular weight, the tougher the resulting film, but the viscosity of the coating composition is increased with increasing polymer molecular weight. Often, the weight average molecular weight of the polyol-containing polymer is within the range of about 300 to 50,000, say, about 500 to 30,000, preferably, 500 to 20,000. The hydroxyl equivalent molecular weight of the polymer is frequently between about 50 and 1000, e.g., 50 to 500, and, in some instances, 70 to 400, and the polymer has on average at least two, say, 2 to 6, hydroxyl groups per molecule.

Illustrative of cross-linking agents suitable for use herein are methylol phenols such as, for example, 2,4,6-trimethylolphenol; polyepoxides such as, for example, glycidyl epoxies or cycloaliphatic epoxies, representative of which are Araldite TM 297, commercially available from Ciba Geigy Corporation, and Epon TM 582, commercially available from Shell Oil Corporation; aminoplasts including the reaction product of aldehyde (e.g., formaldehyde, acetaldehyde, paraformaldehyde, trioxane, etc.) with urea, thiourea, melamine, benzoguanamine, acetoguanamine, dicyandiamine and the like; polyisocyanates and blocked polyisocyanates; and the like.

Aminoplasts which are of particular value in high solids coating compositions are the methylated urea-formaldehyde resins, the alkylated benzoguanamines and methylated melamine-formaldehyde resins with methylated melamine-formaldehyde resins being the most desirable. Representative aminoplasts are disclosed in U.S. Pat. No. 4,520,167, column 5, lines 10 to 62, herein incorporated by reference.

The reactive diluents used in the compositions of this invention contain an amine oxide nitrogen which nitrogen, because of the electron withdrawing effect of the oxide oxygen, does not have sufficient basicity to unduly neutralize any acid catalyst present. Yet, the benefits in adhesion properties provided by the amine are realized. Since the amine does not tend to neutralize undue amounts of catalyst, the amounts of catalyst used can be substantially based on that necessary for catalyzing the cross-linking reactions. Moreover, the presence of salts in the compositions can be minimized which, because of the electroconductivity of salts, can be an important consideration when the coating composition is intended to be applied using electrostatic techniques. The amine oxide reactive diluent may also provide some antistatic properties to the coating compositions and ultimate coatings.

The molecular weight of the reactive diluent is generally selected based upon the sought solvency properties and viscosity properties. Generally, the reactive diluents contain up to about 8 to 12 total carbon atoms. In the structural formula:

each of $R^1$, $R^2$ and $R^3$ may be the same or different. Each of $R^1$, $R^2$ and $R^3$ may contain alkylene $-(CH_2)-_n$ wherein n is 1 to about 8, a branched alkylene, e.g.

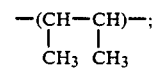

alkyl hydroxy, e.g., hydroxyethyl, 2-hydroxypropyl or hydroxymethyl substitutents; alkylene alkyl ethers, including poly(alkyleneoxide) substituents, e.g., $-(CH_2)_n-(OCH_2CH_2)-_m$ wherein m is from about 1 to 20. Often, $R^1$ and $R^2$ provide hydroxyethyl groups. $R^3$ can also be selected from aralkyls and alkaryls. The reactive diluent contains at least two, say 2 to 3 or 4, groups reactive with the cross-linking agent's "B" groups. Often the diluent is substantially difunctional.

The reactive diluents useful in this invention may be prepared by any suitable technique. For instance, the amine oxide reactive diluents are often prepared by reacting a compound of the formula:

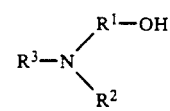

with hydrogen peroxide at elevated temperature, e.g., about 30° C. to 120° C. or more. The reaction is conveniently conducted in an aqueous medium although organic solvents, particularly polar organic solvents, may find utility. The duration of the reaction will vary depending upon the desired degree of conversion of amine and the process conditions including solvent and reaction temperature. Usually, essentially complete conversion of the amine is desired. Catalysts such as tungstate salts, e.g., sodium tungstate, appear to enhance the rate of reaction. Commonly, the reaction is conducted for a period of at least about 0.1 hour, say, about 0.5 to 30 or more hours. Usually, hydrogen peroxide is provided in excess of the amount stoichiometrically required for conversion of the amine to the amine oxide, e.g., at least about 20 percent, say, about 50 to 300 or more percent, in excess. Thus, at the conclusion of the reaction, the residual unreacted hydrogen peroxide can be destroyed and any solvent contained in the product can be removed by stripping.

The relative quantities of cross-linkable polymer and total diluent present in a given composition are subject to variation, depending on factors which include: the solubility characteristics of the various composition components, properties required in a finished coating, economics, volatile organic compound emission limitations and the method of coating application.

In general coating compositions comprise from about 30 to about 70 weight percent of a combination of reactive diluent and volatile organic compound and from about 70 to about 30 weight percent of a combination of the cross-linkable polyol-containing polymer and cross-linking agent, all based upon the total weight of the polyol-containing polymer, reactive diluent, volatile organic compound and cross-linking agent.

The ratio of reactive diluent to volatile organic compound present in a given composition is largely dependent upon the solubility parameters of the polyol-containing polymer, reactive diluent and volatile organic compound employed therein. For example, coating compositions wherein the reactive diluent is a good solvent for the cross-linkable organic polymer can generaly be formulated at higher reactive diluent to volatile organic compound ratios than coating compositions wherein the cross-linkable organic polymer is not as readily solubilized in the reactive diluent. The reactive diluent to volatile organic compound weight ratios of the coating compositions of this invention typically range from about 1/19 to about 3/2. Compositions wherein the reactive diluent to solvent weight ratio is within the higher region of this scale (i.e., in excess of about ½) are generally preferred for applications having relatively stringent volatile organic compound emission requirements.

It should be appreciated that a coating composition may be formulated at higher reactive diluent to volatile organic compound ratios than are described above, (i.e., about 3/2 to about 9/1).

Most preferably, a composition is provided with sufficient cross-linking agent to provide a polyol-containing polymer to cross-linking agent weight ratio of from about 9/1 to about 1/1.

The compositions of this invention may be further comprised of one or more cross-linking catalysts. Catalyst selection is usually dictated by the choice of cross-linking agent. For example, if aminoplasts having methoxymethyl functionality are employed to cross-link the polyol polymer and reactive diluent, a strong acid catalyst is preferred. Illustrative of the strong acid catalysts of the invention are one or more of the following: alkylsulfonic acids, such as p-toluenesulfonic acid, alkylarylsulfonic acids such as a $C_{10}$ to $C_{18}$ alkylbenzenesulfonic acid, and the like. Whereas, if aminoplasts having methoxymethyl-imino functionality are employed as cross-linking agents, weak acid catalysts are preferred. Weak acid catalysts include one or more of the following: phosphate ester such as dialkyl hydrogen phosphate, aryl hydrogen phosphates and the like, as well as carboxylic acids having pKa values in excess of about 1.9 such as citric, maleic and phthalic acid. When the crosslinking agent is a diisocyanate or a blocked isocyanate, suitable catalysts include tertiary amines such as triethyl amine, bis(dimethylaminoethyl) ether and the like; and organometallic salts of tin, mercury, zinc, bismuth and the like, such as dibutyl tin diacetate, zinc octoate, phenyl mercuric acetate and bismuth octoate.

The amount of catalyst required to promote the reaction is dependent upon the curing conditions required in the coating process employed. Those skilled in the art may readily determine the catalyst level with a routine amount of experimentation. In practice, if a catalyst is desired it is usually employed in a concentration of about 0.02 to about 2.5 percent by weight, based on the weight of the film-forming polymer.

In addition to the previously described components, the compositions of this invention may further comprise one or more additives such as are conventionally included in coating compositions.

Conventional additives include pigments, surface active agents, plasticizers, biocides, antistatic agents and the like. When present, the total amount of all such conventional additives typically does not exceed about 50 weight percent of the coating composition; the total amount of surface active agent and plasticizers present generally representing less than about 2 percent of the total composition weight.

The following examples are illustrative of the present invention:

EXAMPLE 1

A mixture of 44.28 grams of t-butyl diethanolamine and 155.72 grams of methanol is charged to a 500-ml., round bottom, three-necked flask equipped with pressure equalizing dropping funnel, thermometer, reflux condenser, magnetic stir bar and magnetic stirrer. Both ice bath and heating mantle are maintained in readiness. A solution of 33.3 grams of 30 weight percent hydrogen peroxide is added to the dropping funnel. The addition of hydrogen peroxide solution to the amine is begun at 28° C. and is completed in 53 minutes. The maximum temperature during the addition is 33° C. At the end of the addition period the liquid temperature is at 33° C. for about another three hours. Spot tests for amine (phenolphthalein) and hydrogen peroxide are both positive after the reaction mixture stands overnight. Titrations of small samples for amine and hydrogen peroxide indicate about 80 percent of the starting amount of amine and about 40 percent of the hydrogen peroxide remained. The reaction mixture is heated to 55° C. for three hours and titrated again showing some more amine consumption and nearly complete hydrogen peroxide consumption. Additional hydrogen peroxide is added and the reaction mixture is heated to 55° C. to 60° C. until the amine test is negative (13 additional hours). The final product is freed of volatiles under vacuum and at 60° C. leaving 41.79 grams of a liquid product. Analysis by nuclear magnetic resonance spectroscopy indicates the mixture contains about 75 mole percent of N,N-bis(2-hydroxyethyl)-t-butylamine oxide based on total amine content.

EXAMPLE 2

The preparation is essentially the same as that of Example 1 except that water is used as solvent.

A mixture of 51.94 grams (94 percent purity) of n-hexyl diethanolamine and 57.62 grams of water are contained in the reactor and treated with 32.77 grams of 30 weight percent hydrogen peroxide. A total of 5.5 hours of heating at 50° C. is sufficient to convert about 90 percent of the amine. Additional hydrogen peroxide (2.35 grams contained) is then added and the mixture is heated at 50° C. for about 12 hours and essentially all the amine starting material is consumed. A product of about 38.79 grams of a light brown, viscous liquid containing N,N-bis(2-hydroxyethyl)-n-hexylamine oxide is obtained.

EXAMPLE 3

A coating composition is prepared by mixing 2.22 grams of Cargill-7451 Resin (a water-reducible short oil baking alkyd, 100 percent solids, obtained from Cargill, Inc., Minneapolis, Minn.) in 2.21 grams of acetone with 1.38 grams of the crude N,N-bis-2-hydroxyethyl) t-butylamine oxide obtained in Example 1, 0.60 gram of triethylamine, 6.49 grams of deionized water and 2.60 grams (2.34 grams contained with 0.26 gram of isobutanol solvent) of Cymel-327 (a formaldehyde/melamine aminoplast cross-linking agent available from American Cyanamid Company, Stamford, Conn. U.S.A.) The resulting clear solution is applied at 1.2 mils wet thickness (#12 wire wound rod) to a steel panel and heated in a forced draft, temperature controlled oven at 121° C.

After 15 minutes the coating withstands rubbing with an acetone-soaked paper towel and scratching with a fingernail. However, if the acetone rubbed area is scratched immediately after rubbing it was possible to damage the coating. After drying for a few minutes the acetone rubbed area is again resistant to scratching. Cure times of up to 60 minutes at 121° C. gave similar results. The coating is clear and light brown in color and the surface is glossy. Rapid manual bending of the steel panel 180° through about a ¼ to ½ inch radius and restraightening did not crack the coating, thus indicating good adhesion of the coating.

EXAMPLE 4

Using the methodology of Example 3 a coating composition is made from 2.22 grams of Cargill 7451 resin (which had been freed of gel particles by dissolving in acetone and filtration and then the bulk of the acetone removed by stripping at 45° C. to 50° C. and final vacuum of about 3 mm Hg), 1.38 grams of N,N-bis-(2-hydroxyethyl) n-hexylamine oxide, 0.15 grams of triethylamine, 4.49 grams (4.04 grams contained aminoplast, 0.031 equivalents based on 90% aminoplast, 10% isobutyl alcohol) of Cymel-327, 7.07 grams of water and 0.13 gram of acetone which remains after stripping. A coating on a steel panel is cured for 60 minutes at 250° F. (121° C.) to provide a clear, slightly yellow cured coating. The coating withstands rubbing with an acetone-soaked paper towel and scratching with a fingernail. Rapid manual bending of the steel panel 180° through about ¼ to ½ inch radius and restraightening did not crack the coating. A coating composition is prepared with the same proportions excepting that the amount of cross-linker is only half as much and the coating did not cure into an acceptably hard, tough coating after 60 minutes at 121° C.

It is claimed:

1. Coating composition comprising polyol-containing polymer, at least one cross-linking agent reactive with hydroxyls, and at least one reactive diluent of the formula

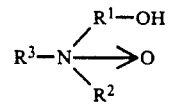

wherein $R^1$ is alkylene of 1 to about 6 carbon atoms; $R^2$ is alkyl or alkylhydroxy or alkylene alkyl ether of 1 to about 20 carbon atoms; and $R^3$ is alkyl of 1 to about 10 carbon atoms, aryl of 6 to 10 carbon atoms, alkaryl of 7 to 10, carbon atoms, or aralkyl of 7 to 10 carbon atoms which $R^1$, $R^2$ and $R^3$ may be substituted with hydroxy, with the proviso that the reactive diluent contains at least two reactive hydroxyl groups.

2. The coating composition of claim 1 wherein $R^2$ of the reactive diluent is an alkyl hydroxy group.

3. The coating composition of claim 2 wherein the reactive diluent comprises substituted bis(2-hydroxyethyl)amine oxide.

4. The coating composition of claim 2 wherein $R^3$ comprises alkyl.

5. The coating composition of claim 1 wherein the reactive diluent is N,N-bis(2-hydroxyethyl)-t-butylamine oxide.

6. The coating composition of claim 1 wherein the reactive diluent comprises N,N-bis(2-hydroxyethyl)-n-hexylamine oxide.

7. The coating composition of claim 1 further comprising acidic cross-linking catalyst.

8. A cured product of the coating composition of claim 1.

9. A cured product of the coating composition of claim 4.

10. A cured product of the coating composition of claim 6.

* * * * *